US009886858B2

(12) United States Patent
Murray et al.

(10) Patent No.: US 9,886,858 B2
(45) Date of Patent: Feb. 6, 2018

(54) LANE CHANGE DETECTION (71) Applicants: Shane Murray, Wilmington, MA (US); Ulf Nordqvist, Yokohama (JP)

(72) Inventors: Shane Murray, Wilmington, MA (US); Ulf Nordqvist, Yokohama (JP)

(73) Assignee: AUTOLIV DEVELOPMENT AB, Vargarda (SE)

( * ) Notice: Subject to any disclaimer, the term of this patent is extended or adjusted under 35 U.S.C. 154(b) by 0 days.

(21) Appl. No.: 15/517,181

(22) PCT Filed: Oct. 2, 2015

(86) PCT No.: PCT/SE2015/051038
§ 371 (c)(1),
(2) Date: Apr. 6, 2017

(87) PCT Pub. No.: WO2016/056976
PCT Pub. Date: Apr. 14, 2016

(65) Prior Publication Data
US 2017/0309182 A1 Oct. 26, 2017

(30) Foreign Application Priority Data
Oct. 7, 2014 (EP) ..................................... 14187938

(51) Int. Cl.
*B60Q 1/00* (2006.01)
*G08G 1/16* (2006.01)
(Continued)

(52) U.S. Cl.
CPC ............ *G08G 1/167* (2013.01); *G01S 13/931* (2013.01); *G08G 1/0112* (2013.01); *G08G 1/04* (2013.01);
(Continued)

(58) Field of Classification Search
None
See application file for complete search history.

(56) References Cited

U.S. PATENT DOCUMENTS 6,249,243 B1 6/2001 Takagi
6,304,811 B1 10/2001 Prestl
(Continued)

FOREIGN PATENT DOCUMENTS

DE 102005042989 B3 8/2006
EP 1020736 A2 7/2000
(Continued)

OTHER PUBLICATIONS

Schlechtriemen et al., "A Lane Change Detection Approach using Feature Ranking with Maximized Predictive Power" IEEE Intelligent Vehicles Symposium (IV), Jun. 8-11, 2014, Dearborn, Michigan, USA; abstract.

(Continued)

*Primary Examiner* — Julie Lieu
(74) *Attorney, Agent, or Firm* — Brinks Gilson & Lione (57) ABSTRACT

The present invention relates to a vehicle safety system and method including a detection system, an emergency control unit and one or more safety devices. The detection system detects a target vehicle positioned longitudinally and laterally displaced relative the detection system, and defines a target vehicle rectangle that at least partly encloses the target vehicle, and constitutes an approximation of the target vehicle. The target vehicle rectangle forms a boundary (k) positioned along a second bearing having a second azimuth angle ($\delta'_1 + \delta'_2$) with reference to a first reference line. The target vehicle rectangle forms a first corner (j) closest to the detection system and positioned along a first bearing having a first azimuth angle ($\delta'_1$) with reference to the first reference line. The detection system calculates a yaw movement ($\theta_A$)
(Continued)

of the target vehicle using the first and second azimuth angles ($\delta'_1$, $\delta'_1+\delta'_2$).

15 Claims, 5 Drawing Sheets

(51) Int. Cl.
  *G08G 1/04* (2006.01)
  *G08G 1/01* (2006.01)
  *G01S 13/93* (2006.01)
(52) U.S. Cl.
  CPC ............ *G01S 2013/9367* (2013.01); *G01S 2013/9375* (2013.01)

(56) References Cited

U.S. PATENT DOCUMENTS

| | | | | |
|---|---|---|---|---|
| 6,691,018 | B1* | 2/2004 | Miyahara | B60K 31/0008 340/435 |
| 2003/0142007 | A1* | 7/2003 | Ono | G01S 13/345 342/70 |
| 2003/0156015 | A1 | 8/2003 | Winner et al. | |
| 2009/0040095 | A1* | 2/2009 | Ogawa | G01S 7/487 342/70 |
| 2009/0292468 | A1* | 11/2009 | Wu | G01S 13/726 701/301 |
| 2010/0169015 | A1* | 7/2010 | Tsunekawa | G08G 1/165 701/300 |
| 2017/0061623 | A1* | 3/2017 | Jaehnisch | G06T 7/20 |

FOREIGN PATENT DOCUMENTS

| | | |
|---|---|---|
| EP | 1357396 A1 | 10/2003 |
| EP | 1577682 A1 | 9/2005 |
| EP | 2275318 A1 | 1/2011 |
| WO | WO 2012/125106 A2 | 9/2012 |

OTHER PUBLICATIONS

International Search Report for Application No. PCT/SE2015/051038, dated Jan. 28, 2016, Form PCT/ISA/210, 7 pgs.

* cited by examiner

LANE CHANGE DETECTION

CROSS REFERENCE TO RELATED APPLICATIONS

This application claims priority to European Patent Application No. 14187938.7, filed on Oct. 7, 2014 and PCT/SE2015/051038, filed on Oct. 2, 2015.

DESCRIPTION OF THE INVENTION

The present invention relates to a vehicle safety system including a detection system, an emergency control unit and a safety device. The detection system is arranged to detect a target vehicle positioned longitudinally and laterally displaced relative the detection system, and to define a target vehicle rectangle that at least partly encloses the target vehicle. The target vehicle rectangle has two sides that are parallel to the target vehicle's present forward running direction and two sides that are perpendicular to the target vehicle's present forward running direction. The target vehicle rectangle forms a first boundary and a second boundary, where the boundaries define a largest extension of the target vehicle rectangle as viewed from the detection system in the azimuth plane. One boundary is positioned along a second bearing having a second azimuth angle with reference to a first reference line.

The present invention also relates to a method for a vehicle safety system, where the method includes the step of using a detection system to detect at least one target vehicle positioned longitudinally and laterally displaced relative the detection system.

Today, radar systems, camera arrangements, Lidar systems, or other sensor devices may be mounted on a vehicle in order to detect objects in order to implement functions of speed control and collision prevention. For such a sensor device it is required to obtain an azimuth angle in the form of a target bearing angle, a distance with respect to the object and a relative speed between the vehicle and the object.

Collision prevention often includes automatic emergency braking systems of different kinds, and for such a system it is of interest to avoid unnecessary automatic braking situations, presumably due to a false alarm, since this causes both distress of a driver, and also possibly undesired traffic situations, for example with respect to vehicles behind the braking vehicle.

It is of interest to accurately detect so-called cut-in situations from oncoming, crossing, or objects travelling in the same direction as a detecting vehicle, where an object such as a vehicle in front of, and in an adjacent lane of, the detecting vehicle suddenly moves into the same lane as, and in front of, the detecting vehicle. This may cause a dangerous traffic situation, especially at high speeds. Such an object does not have to be in front of a detecting vehicle, but is generally longitudinally and laterally displaced relative the detecting vehicle.

EP 1577682 discloses a lane change detection system, but there is a need for a device and a method for a faster and more accurate detection of if a vehicle in front of, and in an adjacent lane of, a detecting vehicle suddenly moves into the same lane as, and in front of, the detecting vehicle. In this way, unnecessary safety actions, such as emergency braking, may be avoided.

The above referenced object is achieved by a vehicle safety system in accordance with the present invention having a detection system, an emergency control unit and a safety device. The detection system is further arranged to detect a target vehicle positioned longitudinally and laterally displaced relative the detection system, and to define a target vehicle rectangle that at least partly encloses the target vehicle. The target vehicle rectangle has two sides that are parallel to the target vehicle's present forward running direction and two sides that are perpendicular to the target vehicle's present forward running direction. The target vehicle rectangle forms a first boundary and a second boundary, where the boundaries define a largest extension of the target vehicle rectangle as viewed from the detection system in the azimuth plane. One boundary is positioned along a second bearing having a second azimuth angle with reference to a first reference line.

Furthermore, the target vehicle rectangle forms a first corner which is defined by the point of the target vehicle rectangle that is closest to the detection system. The first corner is positioned along a first bearing having a first azimuth angle with reference to the first reference line. The detection system is arranged to calculate a yaw movement of the target vehicle relative to a second reference line by means of the first azimuth angle and the second azimuth angle.

The above stated object is also achieved by a method for a vehicle safety system in accordance with the present invention, where the method includes the steps of:

Using a detection system to detect a target vehicle positioned longitudinally and laterally displaced relative the detection system.

The method further may include the steps:

Defining a target vehicle rectangle that at least partly encloses the target vehicle, has two sides that are parallel to the target vehicle's present forward running direction and two sides that are perpendicular to the target vehicle's present forward running direction.

Defining a first boundary and a second boundary of the target vehicle rectangle, where these boundaries define a largest extension of the target vehicle rectangle as viewed from the detection system in the azimuth plane. One boundary is positioned along a second bearing having a second azimuth angle with reference to a first reference line.

Defining a first corner which is defined by the point of the target vehicle rectangle that is closest to the detection system, where the first corner is positioned along a first bearing having a first azimuth angle with reference to the first reference line.

Calculating a yaw movement of the target vehicle relative a second reference line, using the first azimuth angle and the second azimuth angle.

According to an example of the present invention, the vehicle safety system is arranged to determine whether the yaw movement indicates that an emergency situation exists, and whether any safety steps need to be taken. Examples of such safety steps are at least one of activating an alarm signal device and activating an emergency braking system.

According to another example, the yaw movement defines at least one of yaw angle and yaw rate, where furthermore yaw rate includes at least one of yaw speed and yaw acceleration.

According to another example, the detection system is in the form of a radar system, a Lidar system or a camera arrangement.

According to another example, the second reference line is constituted by the extension of an initial forward running direction.

Other examples are disclosed in the following description.

A number of advantages are obtained by the present invention. Mainly, a device and a method for more accurately and more quickly determining if a vehicle safety system needs to be activated is obtained. In particular, the situations concerned relates to when a vehicle in front of, crossing, or in an adjacent lane of a detecting vehicle suddenly moves into the same lane as, and in front of, the detecting vehicle.

BRIEF DESCRIPTION OF THE DRAWINGS

The present invention will now be described more in detail with reference to the appended drawings, where.

DETAILED DESCRIPTION

Figure 1:
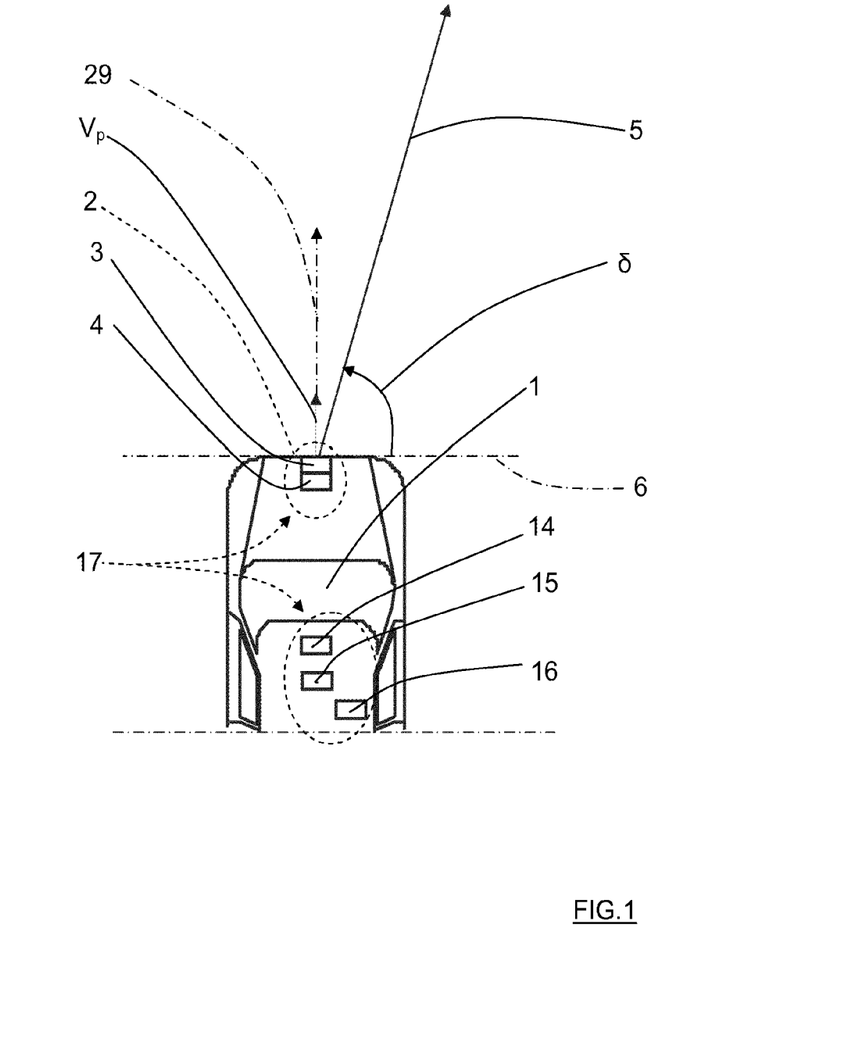
FIG. 1 shows a schematic top view of a vehicle with a radar system.

With reference to FIG. 1, a present vehicle 1 includes a radar system 2, which in turn has a radar transceiver 3 and a radar processing unit 4. The radar transceiver 3 is arranged to send and receive radar signals 5 at different azimuth angles $\delta$ in an azimuth plane with reference to a front line 6 running perpendicular to a present vehicle normal forward running direction 29 at the front of the present vehicle 1 running through the front aperture of the radar transceiver 3, where the present vehicle 1 is moving with a certain first velocity $v_p$.

Figure 2:
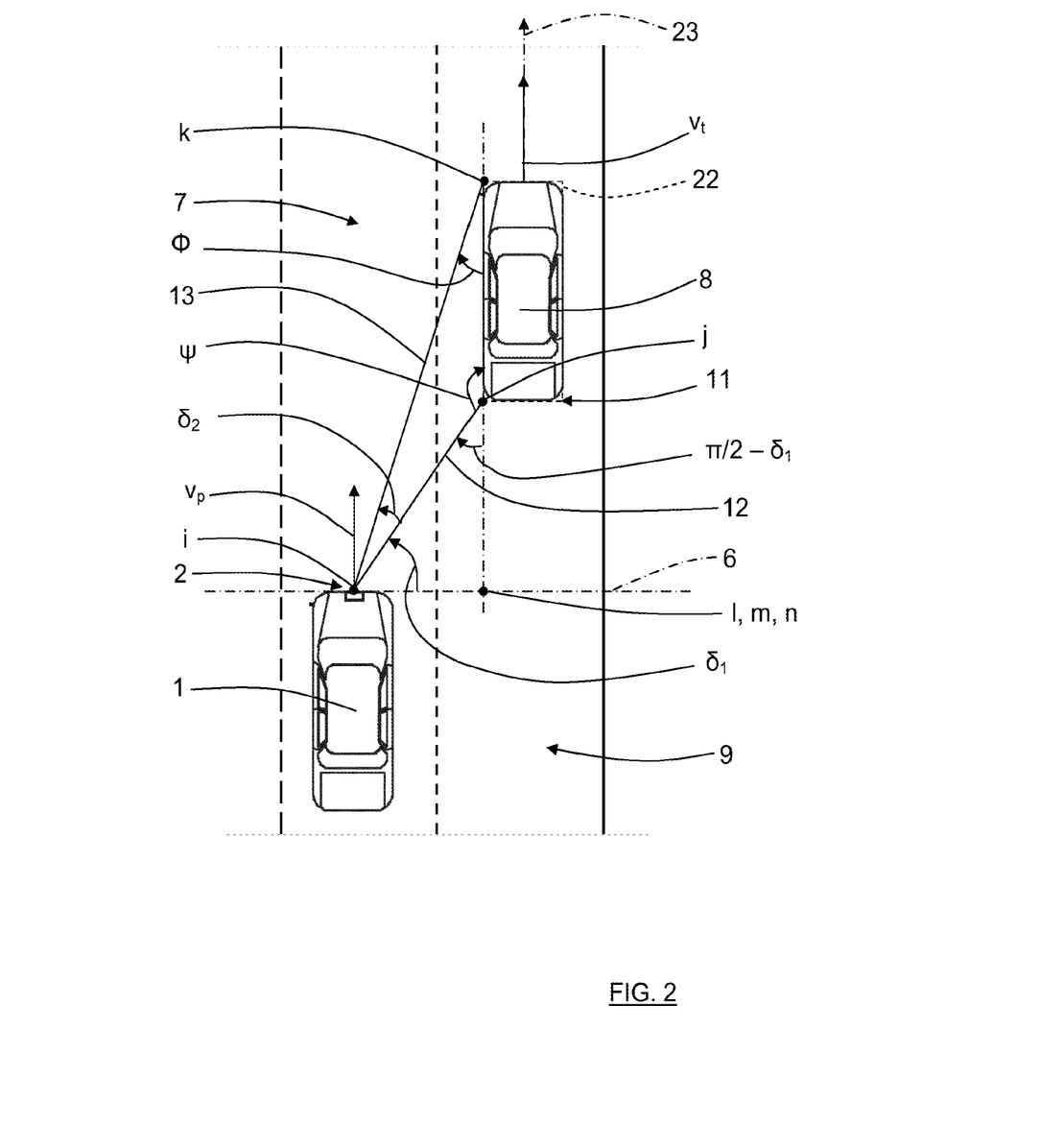
FIG. 2 shows a schematic top view of a vehicle with a radar system and a target vehicle travelling in adjacent lanes on a road.

With reference also to FIG. 2, the present vehicle 1 is travelling in a first lane 7, and a target vehicle 8 is travelling in a second, adjacent, lane 9 with a first target velocity $v_t$ in the target vehicle's initial forward running direction 23.

In the following, a target vehicle rectangle 22 is defined as a rectangle that at least partly encloses the target vehicle 8, has two sides that are parallel to the target vehicle's present forward running direction 23 and two sides that are perpendicular to the target vehicle's present forward running direction 23. In this example, the target vehicle rectangle 22 is defined as the smallest rectangle possible that completely encloses the target vehicle 8. The target vehicle rectangle 22 does not have the have that limitation, but may be smaller or larger than the target vehicle 8.

In this context, the target vehicle rectangle 22 is a rectangular approximation of the target vehicle 8, and is based on radar detections of the largest extension of the target vehicle 8 as viewed by the radar transceiver 3 in the azimuth plane, and a point of the target vehicle 8 that is closest to the radar transceiver 3. Such a closest point is detected by analyzing the tangential rate of reflected radar signals in a previously known manner.

The target vehicle rectangle 22 forms a first boundary k and a second boundary 11, the boundaries k, 11 defining the largest extension of the target vehicle rectangle 22 as viewed from the radar transceiver 3 in the azimuth plane, in other words, the largest width of the target vehicle rectangle 22 as viewed from the radar transceiver 3.

The target vehicle rectangle 22 further forms a first corner j which is defined by the point of the target vehicle rectangle 22 that is closest to the radar transceiver 3, the first corner j being positioned along a first bearing 12 corresponding to a first azimuth angle $\delta_1$ with reference to the front line 6.

The first boundary k is positioned along a second bearing 13, corresponding to a second azimuth angle $\delta_1+\delta_2$ with reference to the front line 6. A difference angle $\delta_2$ denotes the difference between the second azimuth angle $\delta_1+\delta_2$ and the first azimuth angle $\delta_1$.

In the present situation, as illustrated in FIG. 2, there are a number of imaginary lines along which distances and angles are defined in order to be able to explain the present invention. Here, three lines and distances more or less coincide and run parallel to the target vehicle's initial forward running direction 23.

A first distance jm is defined between the first corner j and a first end point m; a second distance kl is defined between the first boundary k and a second end point l; and a third distance jn is defined between the first corner j and a third end point n. Furthermore, there is a fifth end point i in the middle of the front of the vehicle, at the front aperture of the radar transceiver 3, where all end points m, l, n, i lie on the front line 6. The first distance jm and the second distance kl are always parallel to the target vehicle's initial forward running direction 23.

The third distance jn is always parallel to the target vehicle's present forward running direction 23, 23' 23"; the target vehicle's forward running direction changing when the target vehicle 8 changes travel direction. In the scenario of FIG. 1, the initial forward running direction 23 is also the present forward running direction. The extension of the initial forward running direction 23 is perpendicular to the front line 6.

There is fourth distance il defined between the fifth end point i and the second end point l, a fifth distance im defined between the fifth end point i and the first end point m, and a sixth distance in defined between the fifth end point i and the third end point n. The fourth distance il, fifth distance im and sixth distance in are equal since the first end point m, second end point l and third end point n coincide.

Furthermore, there is a seventh distance ik defined between the fifth end point i and the first boundary k, and an eighth distance ij defined between the fifth end point i and the first corner j. The seventh distance ik extends along the extension of the second radar bearing 13, and the eighth distance ij extends along the extension of the first bearing 12.

This means that the first azimuth angle $\delta_1$ is formed between any one of the fourth distance il, fifth distance im, and sixth distance in, and the extension of the eighth distance ij. Correspondingly, the second azimuth angle $\delta_1+\delta_2$ is formed between of any one of the fourth distance il, fifth distance im, and sixth distance in, and the extension of the seventh distance ik.

There is also a ninth distance jk defined between the first corner j and the first boundary k. The ninth distance jk and the third distance jn extend along one and the same line $21_A$, $21_B$, the ninth distance jk thus also always being parallel to the target vehicle's present forward running direction 23, 23' 23".

There is a third azimuth angle $\psi$ between the extensions of the eighth distance ij, and the ninth distance jk, and a fourth azimuth angle $\varphi$ between the extensions of the seventh distance ik and the ninth distance jk.

Figure 3:
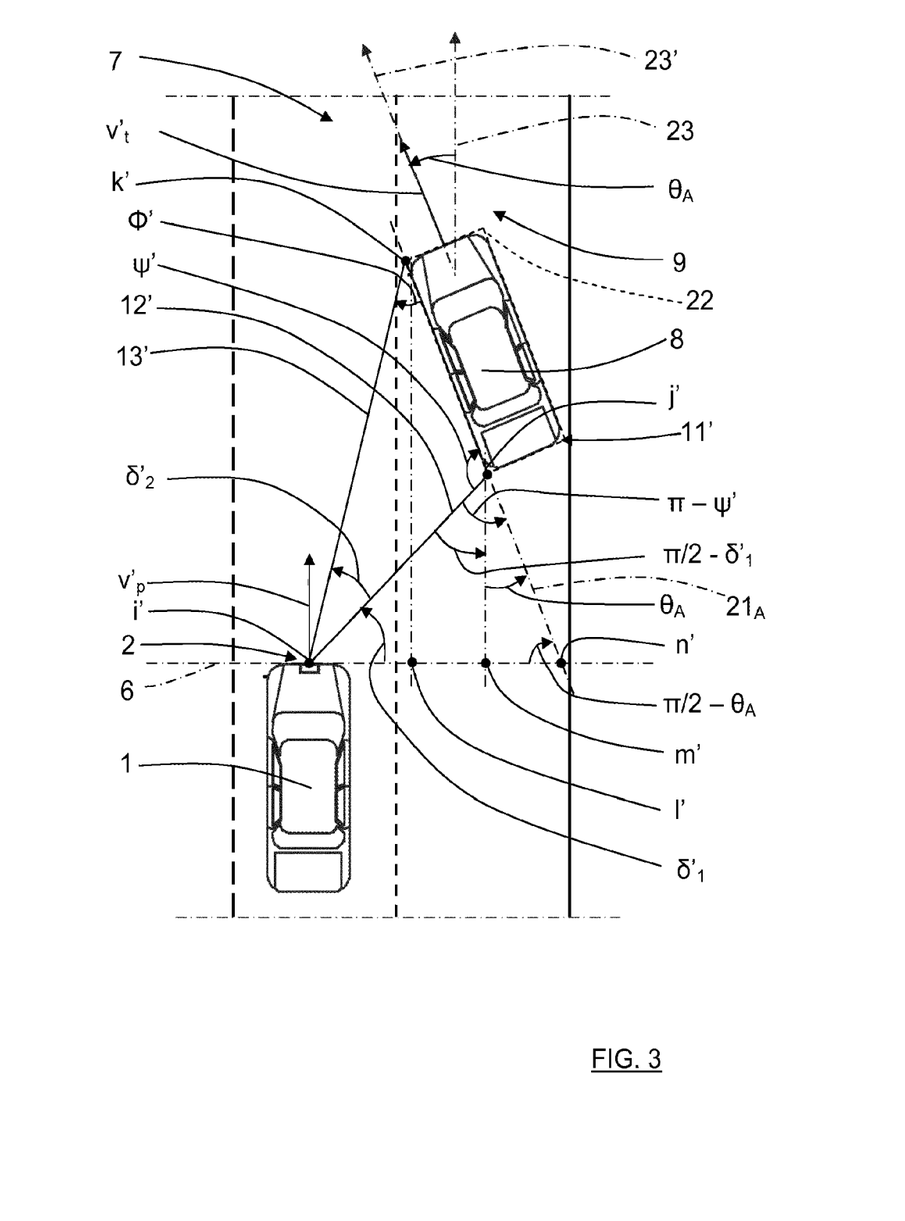
FIG. 3 corresponds to FIG. 2, but where the target vehicle has started a lane change.

With reference to FIG. 3, the target vehicle 8 has performed a change of travel direction with a second target velocity $v'_t$, which will result in a change of lane from the second lane 9 to the first lane 7, where the target vehicle 8 will cut in in front of the present vehicle 1. This is detected by the present vehicle's radar system 2 where a first corner j', which has now changed relative FIG. 2, is positioned along a first bearing 12', having a first azimuth angle $\delta'_1$. Correspondingly, a first boundary k', which has now changed relative FIG. 2, is positioned along a second bearing 13', having a second azimuth angle $\delta'_1+\delta'_2$.

Since the target vehicle's forward running direction 23' has changed compared to its initial forward running direction 23, a first yaw angle $\theta_A$ is formed between the present forward running direction 23' and the initial forward running direction 23. Now, the extensions of the first distance j'm', the second distance k'l' and the third distance j'n' as well as the corresponding first end point m', second end point l' and third end point n', are separated.

The third azimuth angle $\psi'$ and the fourth azimuth angle $\varphi'$ are formed in the same way as before, but having changed values. Due to ordinary angular mathematics and trigonometry, there is a fifth azimuth angle $\pi/2-\delta'_1$ formed between the extensions of the eighth distance i'j' and the first distance j'm', and a sixth azimuth angle $\pi-\psi'$ formed between the extensions of the eighth distance i'j' and the third distance j'n'. The first yaw angle $\theta_A$ is formed between the first distance j'm' and the third distance j'n'. It is evident that the sixth azimuth angle $\pi-\psi'$ equals the sum of the fifth azimuth angle $\pi/2-\delta'_1$ and the first yaw angle $\theta_A$.

Furthermore, it is now desired to find the first distance j'm', the second distance k'l', the fourth distance i'l' and the fifth distance i'm'. The following is therefore valid:

$$\delta'_1 + \delta'_2 = \tan^{-1}\left[\frac{k'l'}{i'l'}\right]$$

where:

$$\delta'_1 = \tan^{-1}\left[\frac{j'm'}{i'm'}\right].$$

This means that:

$$\delta'_2 = \tan^{-1}\left[\frac{k'l'}{i'l'}\right] - \tan^{-1}\left[\frac{j'm'}{i'm'}\right].$$

From the above, the first distance j'm', the second distance k'l', the fourth distance i'l' and the fifth distance i'm' may be calculated.

By means of the Pythagoras theorem, the seventh distance i'k' and the eighth distance i'j' are calculated. Then the seventh distance i'k', the eighth distance i'j' and the difference angle $\delta'_2$ are used to calculate the ninth distance j'k' by means of the cosine rule. Having these data, the ninth distance j'k', the seventh distance i'k' and the eighth distance i'j' are used to calculate the third azimuth angle $\psi'$ by means of the cosine rule.

Since the sixth azimuth angle $\pi-\psi'$ equals the sum of the fifth azimuth angle $\pi/2-\delta'_1$ and the first yaw angle $\theta_A$, it follows that:

$$\pi - \psi' = \frac{\pi}{2} - \delta'_1 + \theta_A.$$

This leads to $$\theta_A = \frac{\pi}{2} - \psi' + \delta'_1.$$

According to the present invention, after having detected boundary, in this case the first boundary k', and the first corner j' which is defined by the point of the target vehicle rectangle 22 that is closest to the radar transceiver 3, the radar processing unit 4 is arranged to calculate a yaw angle $\theta_A$ and yaw rate. This calculation uses the detected first azimuth angle $\delta'_1$ and second azimuth angle $\delta'_1+\delta'_2$. In this example, yaw rate includes yaw speed and/or yaw acceleration. Generally, a yaw movement is calculated.

As could be easily understood, the second boundary 11' could be used instead of the first boundary k'. Then the fourth azimuth angle $\varphi$ would have to be formed and calculated for a bearing extending towards the second boundary 11' instead. It would also be necessary to compensate such that the target vehicle's present forward running direction 23' is headed correctly.

The present vehicle 1 includes an emergency control unit 14 and safety devices 15, 16, in this example in the form of an emergency braking system 15 and an alarm signal device 16, all these only being indicated in FIG. 1 for reasons of clarity of the drawings. Note that other safety devices may be provided beyond the examples provided herein.

The radar processing unit 4 is arranged to output the calculated yaw movement to the emergency control unit 14, which in turn is arranged to determine whether an emergency situation exists and whether any step needs to be taken such as for example an issuing an alarm signal by means of the alarm signal device 16 and/or emergency braking by means of the emergency braking system 15.

Figure 4:
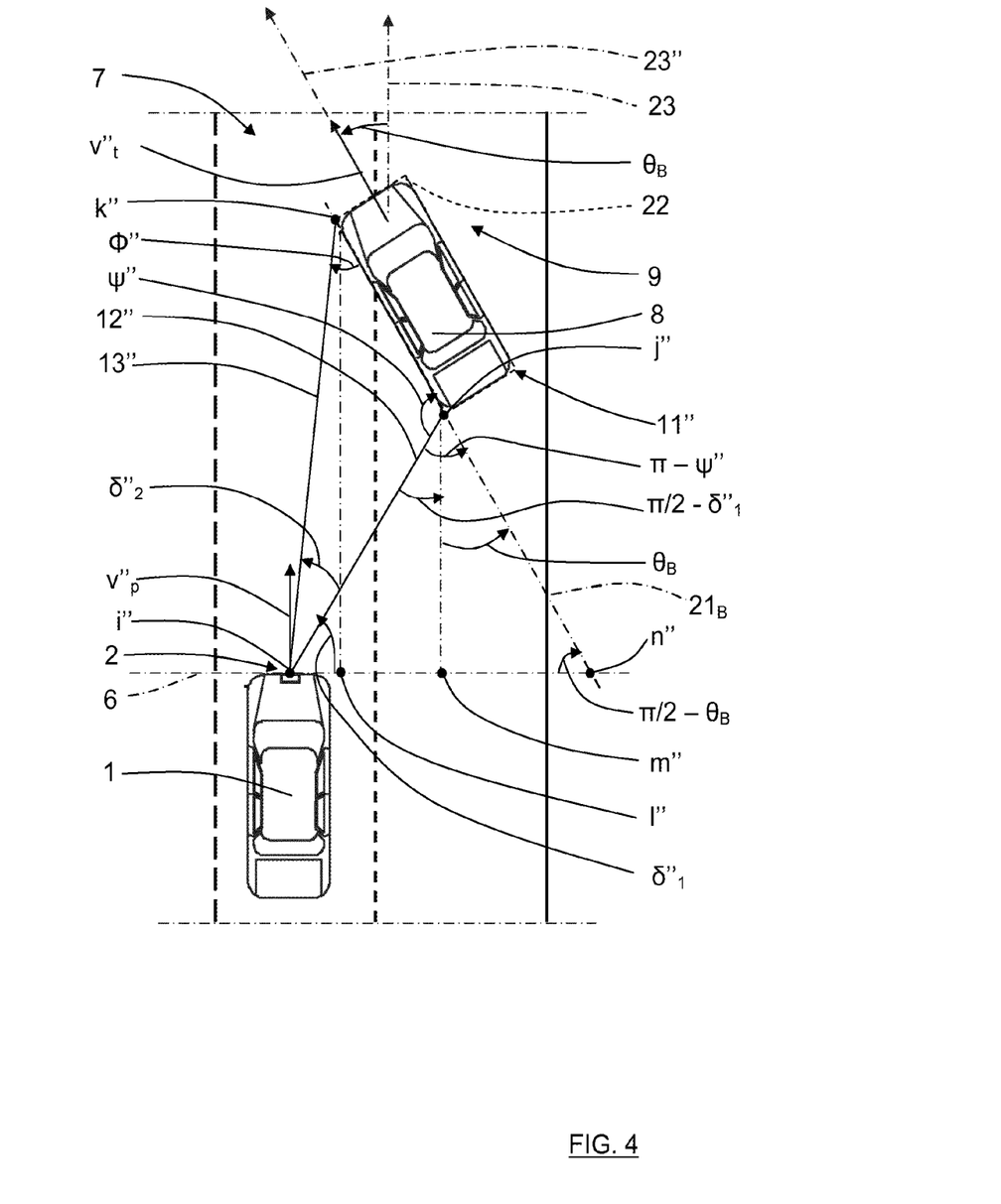
FIG. 4 corresponds to FIG. 3, but where the target vehicle is continuing the lane change.

With reference to FIG. 4, the target vehicle 8 is continuing with its lane changing maneuver, having a third target velocity $v''_t$, the target vehicle 8 now clearly cutting in in front of the present vehicle 1. This is detected by the present vehicle's radar system 2, where a first corner j'', which has now changed relative FIG. 3, is positioned along a first bearing 12'', having a first azimuth angle $\delta''_1$ Correspondingly, a first boundary k'', which has now changed relative FIG. 3, is positioned along a second bearing 13'', having a second azimuth angle $\delta''_1+\delta''_2$.

End points i'', l'', m'' and n'' are formed in the same way as before, as well as azimuth angles $\psi''$, $\varphi''$, $\pi/2-\delta''_1$, $\pi-\psi''$.

In a manner corresponding to the one described with reference to FIG. 3, a second yaw angle $\theta_B$ is calculated as:

$$\theta_B = \frac{\pi}{2} - \psi'' + \delta''_1.$$

Other detection systems than radar systems are conceivable, such as for example Lidar systems or camera arrangements.

In the example disclosed above, the target vehicle 8 has been shown as positioned in front of and laterally displaced relative the radar system 2. However, generally, the target vehicle 8 is longitudinally and laterally displaced relative a detection system 2.

Figure 5:
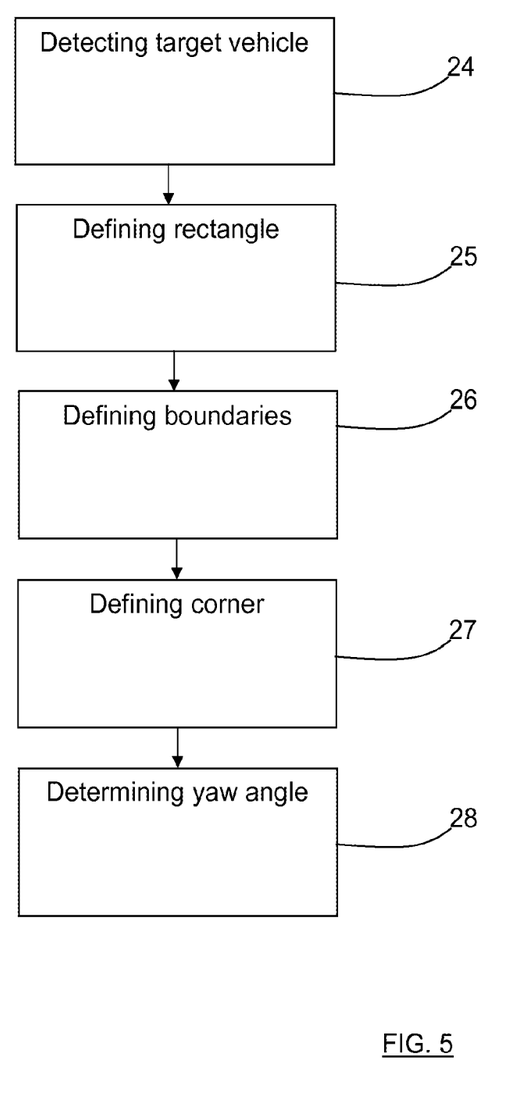
FIG. 5 shows a flowchart for a method according to the present invention.

With reference to FIG. 5, the present invention also relates to a method for a vehicle safety system comprising the steps:

Step 24: using a detection system 2 to detect a target vehicle 8 positioned longitudinally and laterally displaced relative the detection system 2;

Step 25: defining a target vehicle rectangle 22 that at least partly encloses the target vehicle 8, has two sides that are parallel to the target vehicle's present forward running direction 23 and two sides that are perpendicular to the target vehicle's present forward running direction 23;

Step 26: defining a first boundary k and a second boundary 11 of the target vehicle rectangle 22, the boundaries k, 11 defining a largest extension of the target vehicle rectangle 22 as viewed from the detection system 2 in the azimuth plane, where one boundary k is positioned along a second bearing 13 having a second azimuth angle $\delta'_1+\delta'_2$ with reference to a first reference line 6;

Step 27: defining a first corner j which is defined by the point of the target vehicle rectangle 22 that is closest to the detection system 2, the first corner j being positioned along a first bearing 12 having a first azimuth angle $\delta'_1$ with reference to the first reference line 6; and Step 28: calculating a yaw angle $\theta_A$ of the target vehicle 8 relative a second reference line 23 using the first azimuth angle $\delta'_1$ and the second azimuth angle $\delta'_1+\delta'_2$.

The present invention is not limited to the examples above, but may vary freely within the scope of the appended claims. For example, the emergency braking system may be in the form of a vacuum emergency brake or a brake assist device.

The microwave parts of the radar system 2 are assumed to be of a previously known design, and the radar system 2 comprises more parts than shown, for example transmitting and receiving antennas. The radar system 2 may furthermore comprise a number of other parts.

With reference to FIG. 1, the detection system 2, the emergency control unit 14 and the safety device 15, 16 are comprised in a vehicle safety system 17.

All details given in the example, are of course only given as an illustration of the present invention, and should not be regarded as limiting in any way.

In the examples, the radar transceiver 3 is arranged to send and receive radar signals 5 at different azimuth angles $\delta$ in an azimuth plane with reference to the front line 6. Generally, the detection system 2 is arranged to send and receive detection signals 5 at different azimuth angles $\delta$ in an azimuth plane with reference to a first reference line 6.

The yaw angles $\theta_A$, $\theta_B$ are in the examples formed between a present forward running direction 23', 23" and the initial forward running direction 23. Generally, the yaw angles $\theta_A$, $\theta_B$ are formed between a second reference line and a third reference line, where the third reference line differs from the second reference line by the yaw angle. This means that the third reference line changes as the forward running direction changes, but not the second reference line. The second reference line is for example set at certain times, and when a yaw movement is detected, the last second reference line that has been set is used. The term initial when relating to the forward running direction 23 is referred to a set running direction that is used for calculating the yaw angel.

In the present examples, the second reference line is constituted by the extension of the initial forward running direction 23 and the third reference line is constituted by the extension of the present forward running direction 23, 23', 23". However, such a match is not necessary, but generally the third reference line should differ from the second reference line by the yaw angle.

In the examples above, the target vehicle 8 has mainly been traveling in the same direction as the present vehicle 1, but it is conceivable that the target vehicle 8 mainly is travelling towards the present vehicle 1. In this case, the yaw angle is determined in a corresponding manner as for the case described where the target vehicle 8 mainly is traveling in the same direction as the present vehicle 1. It will be necessary to compensate such that the target vehicle's present forward running direction 23' is headed correctly.

Generally, the present invention can be applied to target vehicles at orientations different than target vehicles mainly travelling in the same direction as a present vehicle such as for example crossing or oncoming target vehicles.

Generally, the present invention relates to a vehicle safety system having a detection system 2, an emergency control unit 14 and one or more safety devices 15, 16. The detection system 2 is arranged to detect a target vehicle 8 positioned longitudinally and laterally displaced relative the detection system 2. The vehicle safety system is arranged to be comprised in a present vehicle.

While the above description constitutes the preferred embodiment of the present invention, it will be appreciated that the invention is susceptible to modification, variation and change without departing from the proper scope and fair meaning of the accompanying claims.

The invention claimed is:

1. A vehicle safety system comprising a detection system, an emergency control unit and at least one safety device, where the detection system is arranged to detect a target vehicle positioned longitudinally and laterally displaced relative to the detection system, and to define a target vehicle rectangle that at least partly encloses the target vehicle, where the target vehicle rectangle has two sides that are parallel to an initial forward running direction of the target vehicle and two sides that are perpendicular to the initial forward running direction of the target vehicle, where the target vehicle rectangle further forms a first boundary and a second boundary, the first and the second boundaries defining a largest extension of the target vehicle rectangle as viewed from the detection system in an azimuth plane, where the first boundary is positioned along a second bearing having a second azimuth angle with reference to a first reference line, wherein the target vehicle rectangle forms a first corner which is defined by a point of the target vehicle rectangle that is closest to the detection system, the first corner being positioned along a first bearing having a first azimuth angle with reference to the first reference line, where the detection system is arranged to calculate a yaw movement of the target vehicle relative to a second reference line representing a change in direction of the target vehicle with respect to the initial forward running direction using the first azimuth angle and the second azimuth angle.

2. A vehicle safety system according to claim 1, further comprising the vehicle safety system is arranged to determine whether the yaw movement indicates that an emergency situation exists, and whether an activation of the at least one safety device needs to be taken.

3. A vehicle safety system according to claim 2, wherein the activation comprises at least one of activating an alarm signal device and activating an emergency braking system.

4. A vehicle safety system according to claim 1, further comprising the yaw movement comprises at least one of a yaw angle and a yaw rate, where furthermore the yaw rate comprises at least one of a yaw speed and a yaw acceleration.

5. A vehicle safety system according to claim 1, further comprising the detection system is in the form of at least one of a radar system, a Lidar system, or a camera arrangement.

6. A vehicle safety system according to claim 1, further comprising the detection system is in the form of a radar system that comprises a radar transceiver and a radar processing unit, where the radar transceiver is arranged to send and receive radar signals at different azimuth angles in the azimuth plane.

7. A vehicle safety system according to claim 1, further comprising the second reference line is constituted by the extension of the initial forward running direction of the target vehicle.

8. A vehicle safety system according to claim 1, further comprising the target vehicle rectangle is an approximation of the target vehicle, and is based on detections of the largest extension of the target vehicle as viewed by the detection system in the azimuth plane, and the point of the target vehicle that is closest to the detection system.

9. A vehicle safety system according to claim 1, further comprising the target vehicle rectangle is defined as the smallest rectangle possible that completely encloses the target vehicle.

10. A method for a vehicle safety system, where the method comprises the steps of:
   using a detection system to detect a target vehicle positioned longitudinally and laterally displaced relative to the detection system;
   defining a target vehicle rectangle that at least partly encloses the target vehicle, has two sides parallel to an initial forward running direction of the target vehicle and two sides that are perpendicular to the initial forward running direction of the target vehicle;
   defining a first boundary and a second boundary of the target vehicle rectangle, the first and the second boundaries defining a largest extension of the target vehicle rectangle as viewed from the detection system in the azimuth plane, where the first boundary is positioned along a second bearing having a second azimuth angle with reference to a first reference line;
   defining a first corner which is defined by a point of the target vehicle rectangle that is closest to the detection system, the first corner being positioned along a first bearing having a first azimuth angle with reference to the first reference line; and
   calculating a yaw movement of the target vehicle relative to a second reference line representing a change with respect to the initial forward running direction using the first azimuth angle and the second azimuth angle.

11. A method according to claim 10, wherein the method further comprises the step of determining whether the yaw movement indicates that an emergency situation exists, and whether any safety steps need to be taken.

12. A method according to claim 10, further comprising the second reference line is constituted by the extension of the initial forward running direction.

13. A method according to claim 10, further comprising the target vehicle rectangle is used as an approximation of the target vehicle, and is based on detections of the largest extension of the target vehicle as viewed by the detection system in an azimuth plane, and the point of the target vehicle that is closest to the detection system.

14. A method according to claim 10, further comprising the target vehicle rectangle is defined as the smallest rectangle possible that completely encloses the target vehicle.

15. A method according to claim 10, further comprising the yaw movement comprises at least one of a yaw angle and a yaw rate, where furthermore the yaw rate comprises at least one of a yaw speed and a yaw acceleration.

* * * * *